United States Patent Office 2,930,812
Patented Mar. 29, 1960

2,930,812

METHOD OF PURIFICATION OF TEREPHTHALIC ACID AND ITS LOWER ALKYL ESTERS

Rudolf Lotz, Obernburg (Main), Gerhard Wick, Erlenbach (Main), and Arthur Krimm, Obernburg (Main), Germany, assignors to Vereinigte Glanzstoff-Fabriken AG., Wuppertal-Elberfeld, Germany No Drawing. Application April 23, 1958
Serial No. 730,256

Claims priority, application Germany June 6, 1957

13 Claims. (Cl. 260—475)

This invention relates to a process for the separation of terephthalic acid from its contaminant crude source.

More particularly, this invention relates to the recovery of terephthalic acid from its crude products which are derived by the partial oxidation of alkyl substituted benzenes wherein, in some instances, the alkyl substituent thereof is halogenated. In the partial oxidation of alkyl benzenes a crude product is precipitated containing terephthalic acid and other impurities which must be separated therefrom in order that the terephthalic acid may be used for many of its intended ultimate uses. It has long been known, for example, that terephthalic acid must be in a very pure state to be useful in the manufacture of synthetic fibers by condensation polymerization of it with other difunctional reactants.

Processes heretofore employed in the purification of terephthalic acid have not provided means for complete separation of p-toluic acid from terephthalic acid, though it has been priorly suggested that mixtures containing these acids be subjected to additional oxidation in order to overcome the problem of p-toluic acid contamination of the terephthalic acid recovered.

It is the principal object of this invention to provide a simple process whereby terephthalic acid crudes resulting from the partial oxidation of alkyl benzenes may be purified to yield terephthalic acid, or lower alkyl esters of terephthalic acid, in a pure form suitable for use in the manufacture of superpolymerized products useful in the manufacture of fibers, etc.

Another object of this invention is to provide an improved process for the separation of the lower alkyl esters of terephthalic acid from similar esters of its acidic contaminants which are generally present in conjunction with terephthalic acid when it is derived by the partial oxidation of alkyl substituted benzenes.

Other objects will be apparent from the following description, examples and claims.

The objects of this invention are accomplished in general by suspending crude terephthalic acid or the lower alkyl esters of crude terephthalic acid in a liquid nonsolvent for the terephthalic acid and/or its esters and supjecting the suspended material to chlorination by passing a stream of chlorine gas through the liquid suspension under conditions most favorable to side chain chlorination of alkyl substituted aromatic compounds. Among the known conditions for chlorinating side chains of alkyl substituted aromatic compounds preferred in the present process are: (1) maintaining the temperature during chlorination between 100° and 200° C., or (2) by exposure of the reactants during the passage of a chlorine gas stream through the reactant mass to ultraviolet light radiation. It is also apparent that both ultraviolet radiation and heating may be used in combintion to chlorinate the alkyl substituents of the aromatic nucleus.

The method of separation of terephthalic acid from its contaminant p-toluic acid may be carried forward using the acids themselves, or the crude terephthalic acid may be first esterified with a lower aliphatic alcohol containing not in excess of four or five carbon atoms, methyl alcohol being the one normally and most advantageously employed for this purpose. Obviously, other lower aliphatic alcohols, including ethyl alcohol and isopropyl alcohol, provide substantially equivalent esters for the purposes of this invention. It is also within the concept of this invention that the crude acids recovered from partial oxidation of alkyl benzenes, may be first chlorinated and subsequent to chlorination, esterified with similar alcohols prior to the separation of their esters.

In the preferred method of separation of terephthalic acid from its contaminant p-toluic acid the crude product is suspended in a liquid nonsolvent for terephthalic acid but a solvent which is an active solvent for p-chlormethylbenzoic acid. Among the solvents most useful are the chlorinated aliphatic solvents containing less than five carbon atoms, and among these chloroform, methylene chloride and carbon tetrachloride are particularly useful. Other lower aliphatic compounds useful as suspension agents are acetone, ether, ethanol, dioxane, etc. Under certain chlorination conditions water is also useful as the suspension medium. After suspension of the acidic crudes preferably in a volatile aliphatic solvent substantially equivalent to the foregoing organic aliphatic solvents a stream of chlorine gas is bled through the reaction mass while holding the temperature thereof between 100° and 200° C. or while exposing the reactants to the directive influence of ultraviolet light radiation. The principal purpose of the heat and light being top rovide conditions which favor the chlorination of the side chain groups of aromatic nuclei rather than the nucleus itself. The chlorination is carried on until a sufficient amount of chlorine has been retained by the reaction mass to correspond to the transformation of the p-toluic acid originally present to form p-chlormethylbenzoic acid. Most often, the chlorination can be completed in one hour, more or less. The chlorine gas treatment is discontinued, the reaction mass allowed to cool when necessary to room temperature (20–25° C.) and the insoluble terephthalic acid in the suspending organic solvent is recovered by simple filtration. The unwanted p-chlormethylbenzoic acid carried out in solution in the solvent.

Another convenient means of practicing the process of separation of this invention is to esterify the crude terephthalic acid and its contaminant p-toluic acid product with methyl alcohol. The so produced mixed ester is chlorinated at a temperature within a range of 100° to 200° C. Thereafter the dimethyl terephthalate and p-chlormethylbenzoic methyl esters are separated easily by fractional distillation. The distilland may be subjected to repeated chlorinations so that the last traces of p-toluic acid and its esters may be successfully removed from the dimethyl terephthalate by this means.

It is not essential that the chlorination of the terephthalic acid crude be carried forward in an aliphatic organic solvent but the chlorination may be effectuated by suspending the crude acids in a relatively large volume of water and chlorinating the suspension by subjecting the aqueous suspension to ultraviolet light radiation while saturating the aqueous suspension with chlorine gas. This may be done until no further weight increase is observable. Subsequent to chlorination, the suspended solids are filtered off, dried, and p-chlormethylbenzoic acid formed by chlorination of the acidic crudes is dissolved away from the terephthalic acid by means of a selective solvent extraction using, preferably, a chlorinated aliphatic solvent containing less than five carbon atoms, though obviously other solvents may be substituted as illustrated herein and apparent from the solubility character of the chlorinated toluic acid and the nonchlorinated terephthalic acid.

The following examples specifically illustrate useful methods for the practice of this invention.

*Example I*

100 g. of a mixture composed of terephthalic acid and p-toluic acid are suspended in chloroform and chlorinated for about one hour by introduction of chlorine gas with ultraviolet light radiation of the suspension mass. From the p-toluic acid, p-chlormethylbenzoic acid is formed. This chlorinated product is soluble in chloroform, while the terephthalic acid remains insoluble. By simple drawing off by suction, the terephthalic acid can be separated as an insoluble residue and recovered.

*Example II*

100 g. of a mixture consisting of terephthalic acid and p-toluic acid are suspended in 7 l. of water and, with ultraviolet light radiation, chlorinated for about one hour by chlorine gas introduction. After cooling and drawing off of the solid products by suction, together with subsequent drying, the p-chlormethylbenzoic acid can easily be selectively dissolved out with acetone, while the terephthalic acid remains and can be recovered in purest form by esterification with a lower alkyl alcohol containing less than about five carbon atoms and subsequent distillation of the pure ester.

Instead of acetone, other chlorinated hydrocarbons (such as chloroform, methylene chloride and carbon tetrachloride) as well as other nonchlorinated solvents including ether, ethanol, dioxane, etc., may also be used.

The process can also be carried out as in the following Example III.

*Example III*

1000 g. of a crude mixture of aromatic acids as in Example II are esterified in the usual manner with methanol. The ester mixture obtained is chlorinated under heating to about 100° to 200° C. Chlorination is continued until the weight increase of the flask content corresponds to the previously determined content of p-toluic acid, calculated for p-chlormethylbenzoic acid. The separation of the two esters is now accomplished by fractional distillation. Both extremely pure dimethyl terephthalate and also p-chlormethylbenzoic acid methyl ester are obtained. The residues from the ester distillation can be used again and again in the chlorination, so that even the last trace of p-toluic acid is successfully removed from the dimethyl terephthalate.

The above examples illustrate the ease and simplicity of purifying terephthalic acid as it is manufactured by the partial oxidation of alkyl substituted benzenes which may, by such oxidation, contain among the impurities, toluic acid. While the invention has been described and illustrated specifically in relation to chlorine, which is practically preferred because of well established economic advantage in its use over other halogens, it is clear that halogens other than chlorine may also be adapted to the purposes of the invention.

By the purification process described it is now commerically feasible to produce an extremely pure terephthalic acid suited to the many end uses wherein the terephthalic acid must be of extremely pure nature as, for example, in the manufacture of terephthalic acid-dihydric alcohol condensates useful in the manufacture of fibers having many of the properties of wool.

Having thus described our process for purification of terephthalic acid and its esters and illustrated our process by examples, we claim:

1. A method of separation of a terephthalic acid compound selected from the group consisting of terephthalic acid and its lower alkyl esters from a crude mixture containing the same and the corresponding p-toluic acid compound selected from the group consisting of p-toluic acid and its lower alkyl esters which comprises chlorinating a liquid suspension of said crude mixture under side chain chlorinating conditions for a period of time sufficient only to chlorinate the benzene ring methyl substituent of the p-toluic acid compound, and separating the chlorinated from the nonchlorinated products.

2. A method of separation of a terephthalic acid compound selected from the group consisting of terephthalic acid and its lower alkyl esters from a crude mixture containing the same and the corresponding p-toluic acid compound selected from the group consisting of p-toluic acid and its lower alkyl esters which comprises chlorinating a liquid suspension of said crude mixture under side chain chlorinating conditions for a period of time sufficient only to chlorinate the benzene ring methyl substituent of the p-toluic acid compound thereby forming a chlorinated product selected from the group consisting of p-chlormethylbenzoic acid and its lower alkyl esters, and separating the chlorinated from the nonchlorinated products by preferential solution of the chlorinated product selected from the group consisting of p-chlormethylbenzoic acid and its lower alkyl esters in an aliphatic solvent therefor and recovering the purified terephthalic acid compound from said solution.

3. A method of separation of terephthalic acid from p-toluic acid in a crude acid mixture which comprises esterifying the crude acid mixture with a lower aliphatic alcohol containing not more than about five carbon atoms, chlorinating the esterified acids in a liquid suspension of the same under side chain chlorinating conditions for a period of time sufficient only to chlorinate the benzene ring methyl substituent of the p-toluic acid ester thereby forming p-chlormethylbenzoic acid ester, and separating the chlorinated esters from the nonchlorinated esters by fractional distillation.

4. A method of separation of terephthalic acid from crudes derived by the partial oxidation of alkyl substituted benzenes and containing p-toluic acid as an impurity which comprises chlorinating a liquid suspension of said crude acids under side chain chlorinating conditions for a period of time sufficient only to chlorinate the benzene ring methyl substituent of the p-toluic acid thereby forming p-chlormethylbenzoic acid, and separating the chlorinated acid from the nonchlorinated acids by preferential solution of the chlorinated acid in an aliphatic solvent in which said chlorinated acid is soluble and which is a nonsolvent for terephthalic acid and recovering the purified aliphatic solvent insoluble terephthalic acid.

5. A method of separation of terephthalic acid from its crude product form derived by the partial oxidation of alkyl substituted benzenes and containing p-toluic acid as an impurity which comprises esterifying the crude product containing said acids with a lower alkyl alcohol, chlorinating the resultant acidic esters in a liquid suspension of the same under side chain chlorinating conditions for a period of time sufficient only to chlorinate the benzene ring methyl substituent of the p-toluic acid ester thereby forming p-chlormethylbenzoic acid alkyl ester and fractionally distilling the chlorinated and nonchlorinated acid alkyl esters to recover purified dialkyl terephthalate.

6. The method of claim 5, wherein the lower alkyl alcohol contains not more than five carbon atoms.

7. The method of claim 5, wherein the lower alkyl alcohol is methanol.

8. The process of claim 4, wherein the liquid suspension in which side chain chlorination takes place is a volatile aliphatic solvent containing less than about five carbon atoms and which is an active solvent for p-chlormethylbenzoic acid and a nonsolvent for terephthalic acid.

9. The process of claim 4, wherein the temperature of chlorination is 100° to 200° C.

10. The proces of claim 4, wherein the chlorination takes place under ultraviolet light radiation.

11. The process of claim 4, wherein the solvents are chlorinated aliphatic solvents containing less than five carbon atoms.

12. The process of claim 4, wherein the lower aliphatic solvents are selected from the group consisting of chloroform, acetone, methylene chloride, carbon tetrachloride, ether, ethanol and dioxane.

13. The process of claim 4, wherein the liquid suspension agent is water and the side chain directing influence in the chlorination is ultraviolet light.

References Cited in the file of this patent

UNITED STATES PATENTS

| | | |
|---|---|---|
| 2,572,710 | Emerson et al. | Oct. 23, 1951 |
| 2,636,899 | Burrows et al. | Apr. 28, 1953 |
| 2,653,165 | Levine | Sept. 22, 1953 |
| 2,726,262 | Grosskinsky et al. | Dec. 6, 1955 |
| 2,816,134 | Toland | Dec. 10, 1957 |